United States Patent
Wynn, Jr. et al.

(10) Patent No.: US 6,422,205 B2
(45) Date of Patent: Jul. 23, 2002

(54) TWIST OFF PRESSURE REGULATOR CONNECTOR ASSEMBLY

(75) Inventors: James A. Wynn, Jr., Virginia Beach; Barry S. Robinson, Williamsburg, both of VA (US)

(73) Assignee: Siemens Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/770,635

(22) Filed: Jan. 29, 2001

Related U.S. Application Data

(60) Provisional application No. 60/178,410, filed on Jan. 27, 2000.

(51) Int. Cl.[7] .................................................. F02M 37/04
(52) U.S. Cl. .................. 123/457; 123/470; 137/315.04; 137/15.17
(58) Field of Search .................................. 123/468, 469, 123/470, 472, 456, 457; 137/315.04, 315.05, 15.17, 15.18, 454.2

(56) References Cited

U.S. PATENT DOCUMENTS

| | | | |
|---|---|---|---|
| 4,491,060 A | 1/1985 | Boski | 923/128 |
| 4,756,289 A * | 7/1988 | Rock et al. | 123/463 |
| 5,016,594 A | 5/1991 | Hafner et al. | 123/470 |
| 5,121,731 A * | 6/1992 | Jones | 123/470 |
| 5,140,963 A | 8/1992 | Brackett et al. | 123/470 |
| 5,226,391 A * | 7/1993 | Gras et al. | 123/456 |
| 5,299,542 A | 4/1994 | Hafner | 123/470 |
| 5,323,749 A * | 6/1994 | Gras et al. | 123/470 |
| 5,342,126 A | 8/1994 | Heston et al. | 374/208 |
| 5,381,816 A * | 1/1995 | Alsobrooks | 137/15.17 |
| 5,479,900 A | 1/1996 | Bodenhausen et al. | 123/470 |
| 5,724,946 A * | 3/1998 | Franchitto | 123/470 |
| 5,909,725 A | 6/1999 | Balsdon et al. | 123/516 |
| 5,960,819 A | 10/1999 | Weissinger et al. | 137/315 |
| 6,016,831 A * | 1/2000 | Bueser et al. | 137/315.04 |

\* cited by examiner

*Primary Examiner*—Thomas N. Moulis

(57) ABSTRACT

A connector assembly and a method of disconnecting the connector assembly. The connector assembly comprises a first part and a second part. The first part extends along a longitudinal axis and has a protrusion that extends radially outward from the longitudinal axis. The second part receives the first part and has a wall surrounding the longitudinal axis. The wall has an inner surface generally confronting the longitudinal axis, an outer surface generally facing opposite the inner surface, a channel cooperatively receiving the protrusion; and an arm portion. The arm portion has a first surface defining a portion of the inner surface, a second surface defining a portion of the outer surface, and a bulge extending from the arm portion into the channel. The bulge engages the protrusion and maintains the first and second parts in a connected configuration. The method comprises displacing the arm portion relative to the longitudinal axis so as to disengage the bulge from the protrusion, relatively rotating about the longitudinal axis the first and second parts, relatively displacing along the longitudinal axis the relatively rotated first and second parts, and relatively separating the relatively displaced first and second parts.

20 Claims, 4 Drawing Sheets

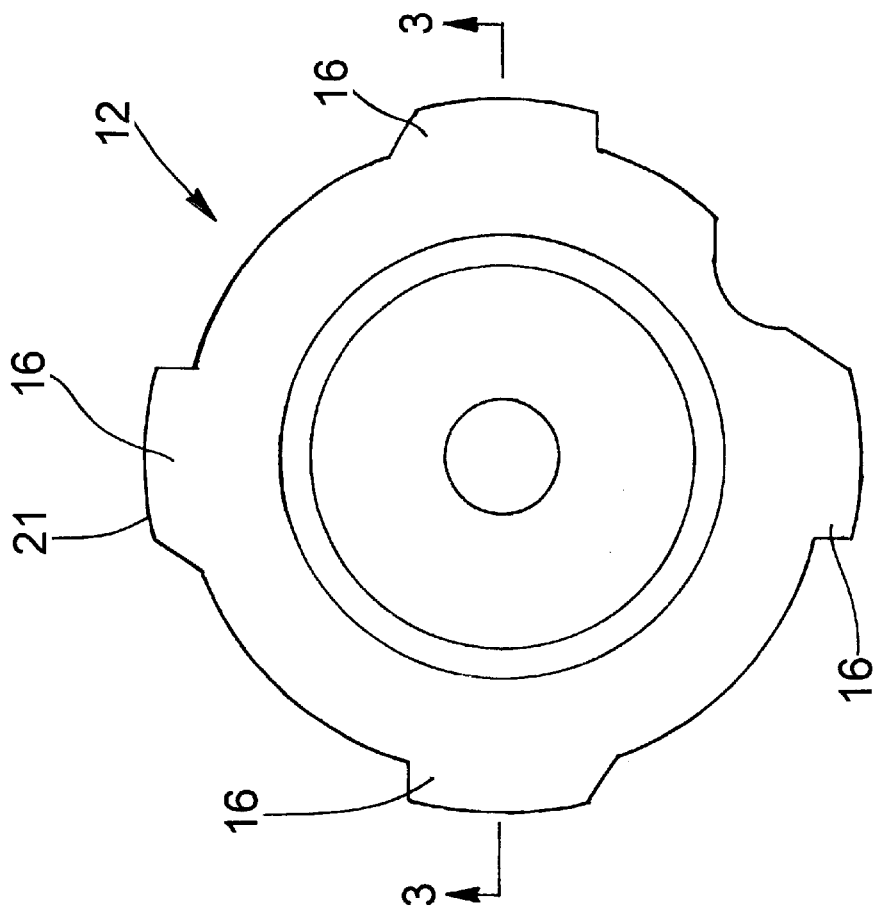
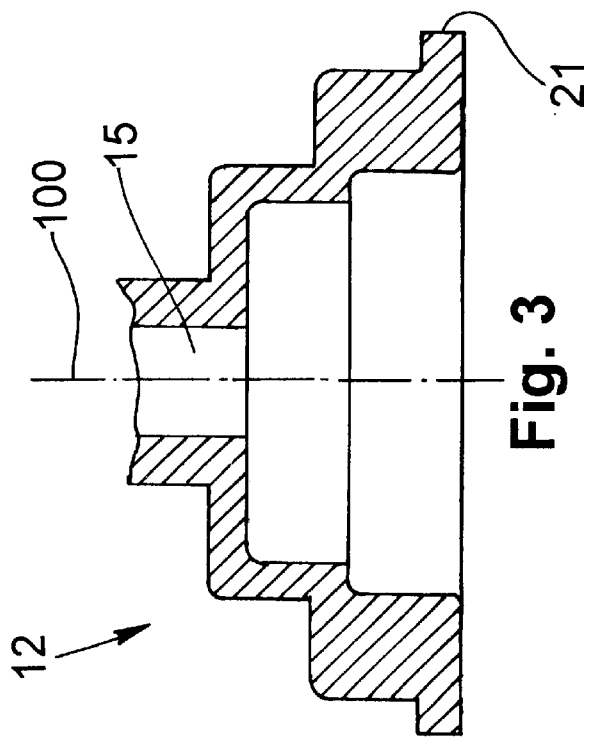

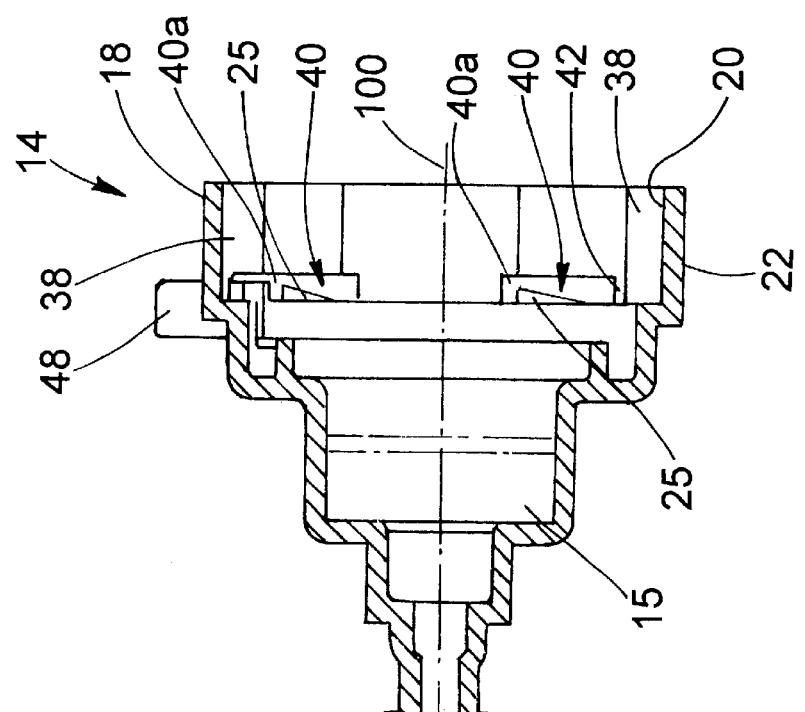
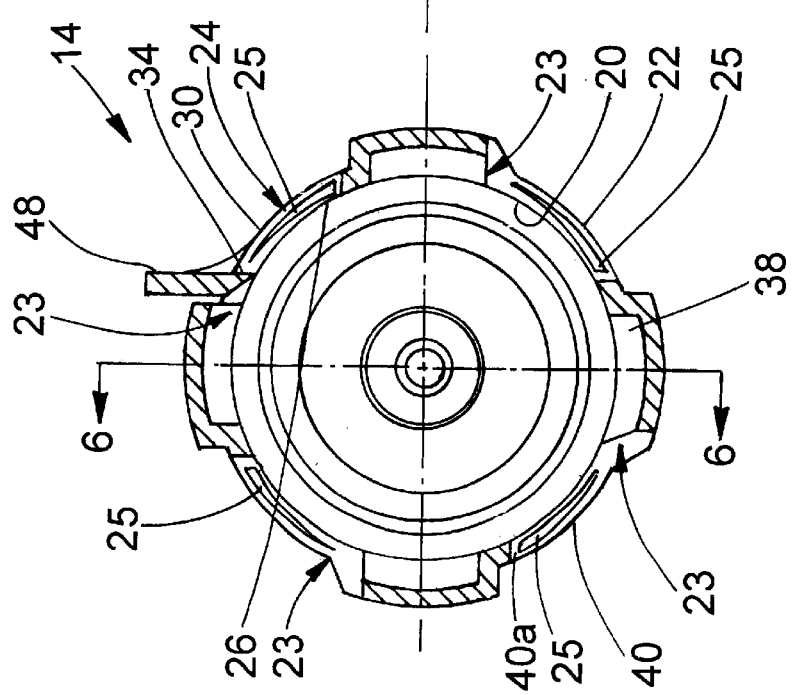

TWIST OFF PRESSURE REGULATOR CONNECTOR ASSEMBLY

CROSS-REFERENCE TO RELATED APPLICATION

The present application claims the benefit of the earlier filing date of U.S. Provisional Application No. 60/178,410, filed Jan. 27, 2000, the entirety of which is incorporated by reference herein.

BACKGROUND OF THE INVENTION

There is a need to be able to readily service, e.g., replace, a pressure regulator in a fuel supply system for an internal combustion engine.

BRIEF SUMMARY OF THE INVENTION

The present invention provides a connector assembly that comprises a first part and a second part. The first part extends along a longitudinal axis and has a protrusion that extends radially outward from the longitudinal axis. The second part receives the first part and has a wall surrounding the longitudinal axis. The wall has an inner surface generally confronting the longitudinal axis, an outer surface generally facing opposite the inner surface, a channel cooperatively receiving the protrusion; and an arm portion. The arm portion has a first surface defining a portion of the inner surface, a second surface defining a portion of the outer surface, and a bulge extending from the arm portion into the channel. The bulge engages the protrusion and maintains the first and second parts in a connected configuration.

The present invention also provides a method of disconnecting a connection between a first part and a second part. The first part extends along a longitudinal axis and has a protrusion that extends radially outward from the longitudinal axis. The second part receives the first part and has a wall that surrounds the longitudinal axis. The wall has an inner surface that generally confronts the longitudinal axis, an outer surface that generally faces opposite the inner surface, a channel that cooperatively receives the protrusion, and an arm portion. The arm portion has a first surface that defines a portion of the inner surface, a second surface that defines a portion of the outer surface, a bulge that extends from the arm portion into the channel for engaging the protrusion and maintaining the first and second parts in a connected configuration, and a grip portion that extends from the second surface. The method comprises displacing the grip relative to the longitudinal axis so as to disengage the bulge from the protrusion; relatively rotating about the longitudinal axis the first and second parts; relatively displacing along the longitudinal axis the relatively rotated first and second parts; and relatively separating the relatively displaced first and second parts.

BRIEF DESCRIPTION OF THE DRAWINGS

The accompanying drawings, which are incorporated herein, and constitute part of this specification, illustrate the presently preferred embodiments of the invention, and, together with the general description given above and the detailed description given below, serve to explain the features of the invention. In the drawings, as used herein, like numerals indicate like elements throughout:

FIG. 2 is a plan view of a first part of the connector assembly shown in FIG. 1;

FIG. 3 is a cross-sectional view taken along line 3—3 of FIG. 2;

FIG. 5 is a cross-sectional view taken along line 5—5 of FIG. 4; and

FIG. 6 is a cross-sectional view taken along line 6—6 of FIG. 5.

DETAILED DESCRIPTION OF THE INVENTION

Figure 1:
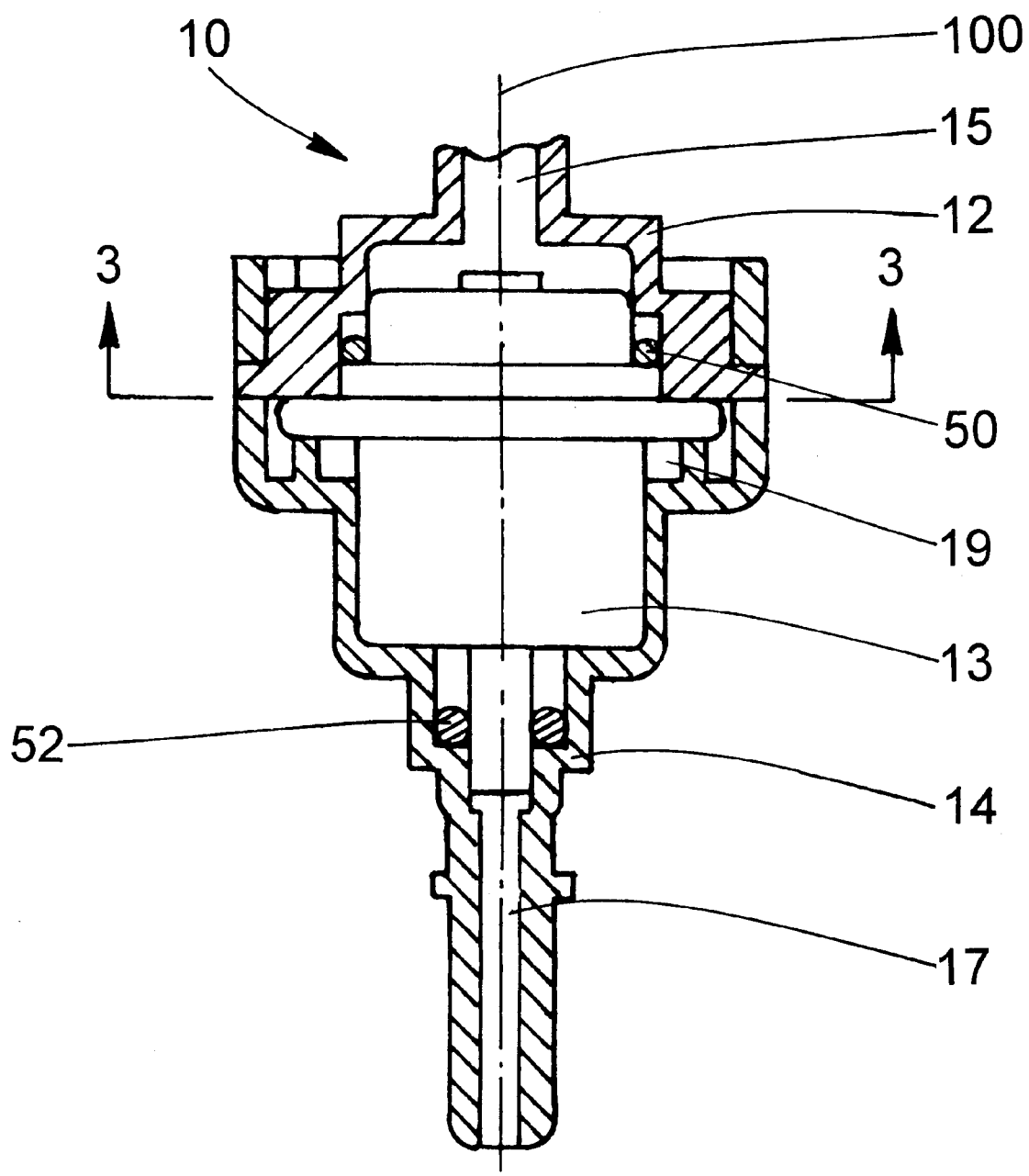
FIG. 1 is a cross-sectional view of a connector assembly with a pressure regulator according to a preferred embodiment.

There is shown in FIG. 1, a twist on pressure regulator connector assembly 10 in a connected configuration. The connector assembly 10 comprises a first part 12 that extends along a longitudinal axis 100 and a second part 14 that receives the first part 12 in the connected configuration. The first part 12 comprises a first fluid passage 15 and the second part 14 comprises a second fluid passage 17. The first passage 15 and the second passage 17 cooperatively define a chamber 19 in the connector assembly 10. The connector assembly 10 further comprises a fluid pressure regulator 13 that is received in the chamber 19. FIG. 2 and FIG. 3 show details of the first part 12. The first part 12 has a protrusion 16 that extends radially outward from the longitudinal axis 100. The first part 12 can have a plurality of the protrusions 16 (four are shown). The protrusion 16 can comprise a tab that lies in a transverse plane with respect to the longitudinal axis 100 and a radially outer face 21.

Figure 4:
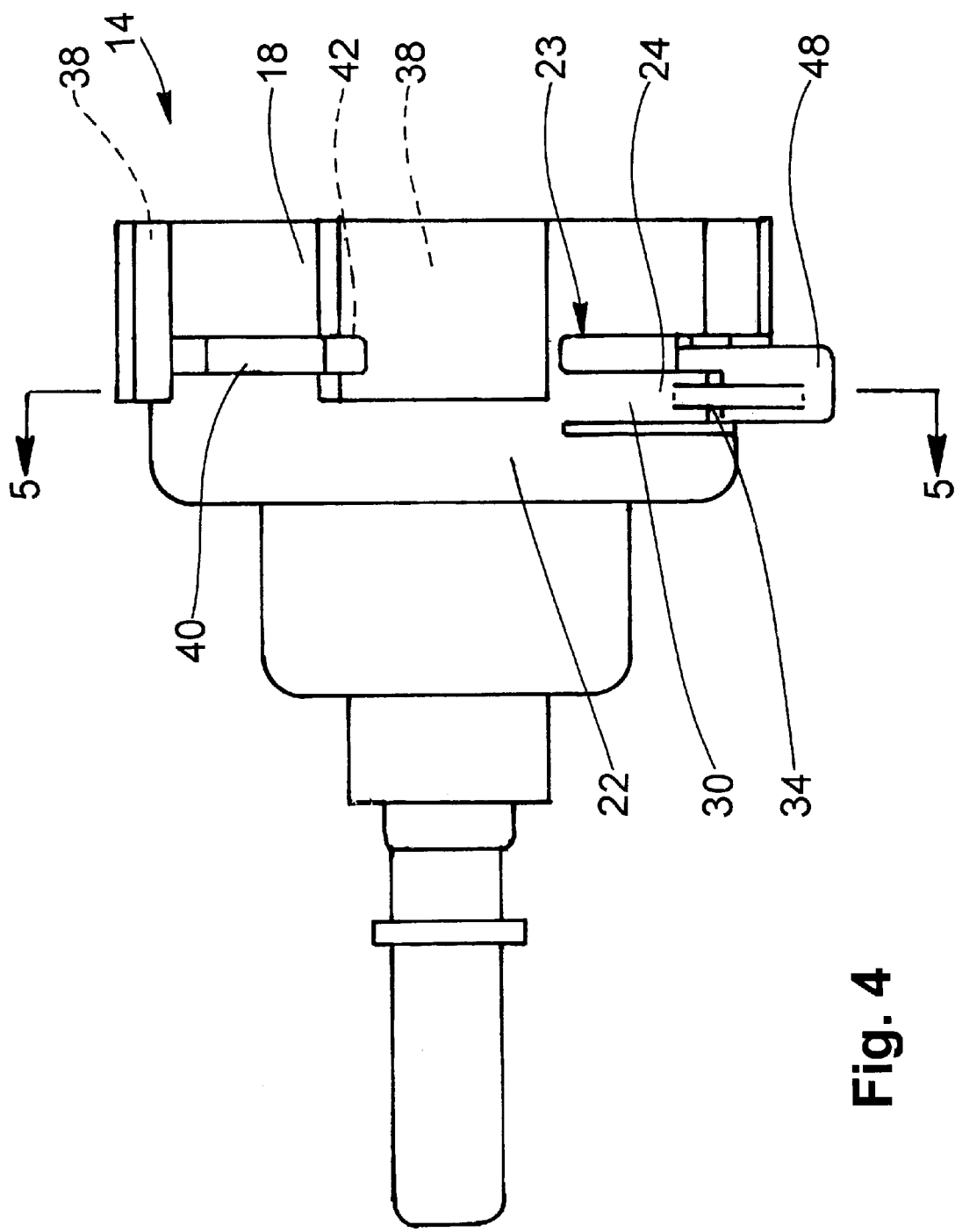
FIG. 4 is an elevation view of the second part of the connector assembly shown in FIG. 1.

Referring now to FIGS. 4–6, details of the second part 14 are shown. The second part 14 has a wall 18 that surrounds the longitudinal axis 100. The wall 18 comprises an inner surface 20 that generally confronts the longitudinal axis 100, and an outer surface 22 that generally faces opposite the inner surface 20. The wall 18 additionally comprises a channel 23 that cooperatively receives the protrusion 16, and an arm portion 24 that has a first surface 26 that defines a portion of the inner surface 20. The arm portion 24 further comprises, a second surface 30 that defines a portion of the outer surface 22, and a bulge 34 that extends from the arm portion 24 into the channel 23. The bulge 34 engages the protrusion 16 and maintains the first and second parts 12,14 in a connected configuration. The arm 24 comprises a grip portion 48 that extends from the second surface 30. The grip portion 48 is adapted to be manipulated to disengage the bulge 34 from the protrusion 16 and allow relative movement between the first part 12 and the second part 14.

The channel 23 comprises a first portion 38 that extends generally parallel to the longitudinal axis 100 and a second portion 40 that generally lies in a transverse plane with respect to the longitudinal axis 100. The first portion 38 connects to the second portion 40 at an intersection 42. The first portion 38 is defined by the inner surface 20 of the wall 18. The second portion 40 penetrates the wall 18, i.e., extends between the inner surface 20 and the outer surface 22. The radially outer surface 21 of the protrusion 16 is generally flush with the outer surface 22 in the connected configuration (see FIG. 1).

The second part 14 further comprises a plurality of the channels 23 (four are shown). Each of the plurality of protrusions 16 is received in a corresponding one of the plurality of channels 23 when the connector assembly 10 is assembled. There can be an equal or greater number of channels 23 than protrusions 16. The protrusions 16 and channels 23 can be equiangularly spaced about the longitudinal axis 100. The protrusion 16 is axially translatable along the first portion 12, and the protrusion 16 pivots about the longitudinal axis 100 along the second portion 14. A transition between the translating and the pivoting occurs in the intersection 42.

The wall 18 comprises a ridge 25 that extends axially into the second portion 40. The ridge 25 has a peak that lies in an oblique plane with respect to the transverse plane. The second portion 40 extends from the intersection 42 to a terminus 40a, and the oblique plane is oriented such that the peak extends further into the second portion 40 proximate the terminus 40a than proximate the intersection 42. The wall 18 has a first radial thickness between the inner surface 20 and outer surface 22, and the ridge 25 has a second radial thickness that is less than the first radial thickness. The ridge 25 can be deformable i.e., elastically or plastically deformable relative to the wall 18.

The connector assembly 10 further comprises a first seal 50 that is interposed between the first fluid passage 15 and the fluid pressure regulator 13. The connector assembly 10 also includes a second seal 52 that is interposed between the second fluid passage 17 and the fluid pressure regulator 13. Substantially all fluid flow between the first fluid passage 15 and the second fluid passage 17 passes through the fluid pressure regulator 13 in the connected configuration.

A method of disconnecting the connection of the twist off connector assembly 10 will now be described. The method comprises displacing the grip 48 relative to the longitudinal axis 100 so as to disengage the bulge 34 from the protrusion 16. The first part 12 and second part 14 can then be rotated about the longitudinal axis 100. After rotating, the first part 12 and second part 14 can be relatively displaced along the longitudinal axis 100. The first part 12 and second part 14 can then be separated, and the fluid pressure regulator 13 may then be extracted from between the relatively separated first part 12 and second part 14.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A connector assembly comprising:
   a first part extending along a longitudinal axis, the first part having a protrusion extending radially outward from the longitudinal axis; and
   a second part receiving the first part and having a wall surrounding the longitudinal axis, the wall having:
   an inner surface generally confronting the longitudinal axis,
   an outer surface generally facing opposite the inner surface,
   a channel cooperatively receiving the protrusion; and
   an arm portion having a first surface defining a portion of the inner surface, a second surface defining a portion of the outer surface, and a bulge extending from the arm portion into the channel, the bulge engaging the protrusion and maintaining the first and second parts in a connected configuration.

2. The connector assembly according to claim 1, wherein the first part comprises a plurality of the protrusions and the second part comprises a plurality of the channels, each of the plurality of protrusions is received in a corresponding one of the plurality of channels in the connected configuration.

3. The connector assembly according to claim 2, wherein there are an equal number of the protrusions and the channels, and the protrusions and channels are equiangularly spaced about the longitudinal axis.

4. The connector assembly according to claim 1, wherein the protrusion comprises a tab lying in a transverse plane with respect to the longitudinal axis.

5. The connector assembly according to claim 1, wherein the channel comprises a first portion extending generally parallel to the longitudinal axis and a second portion generally lying in a transverse plane with respect to the longitudinal axis, and the first portion connecting to the second portion at an intersection.

6. The connector assembly according to claim 5, wherein the first portion is defined by the inner surface of the wall, and the second portion extends between the inner and outer surfaces.

7. The connector assembly according to claim 6, wherein the protrusion comprises a radially outer face that is generally flush with the outer surface in the connected configuration.

8. The connector assembly according to claim 5, wherein the protrusion is axially translatable along the first portion and the protrusion pivots about the longitudinal axis along the second portion, and a transition between the translating and the pivoting occurs in the intersection.

9. The connector assembly according to claim 5, wherein the wall comprises a ridge extending axially into the second portion.

10. The connector assembly according to claim 9, wherein the ridge has a peak lying in an oblique plane with respect to the transverse plane.

11. The connector assembly according to claim 10, wherein the second portion extends from the intersection to a terminus, and the oblique plane is oriented such that the peak extends further into the second portion proximate the terminus than proximate the intersection.

12. The connector assembly according to claim 9, wherein the wall has a first radial thickness between the inner and outer surfaces, and the ridge has a second radial thickness that is less than the first radial thickness.

13. The connector assembly according to claim 9, wherein the ridge is deformable relative to the wall.

14. The connector assembly according to claim 1, wherein the arm comprises a grip portion extending from the second surface, the grip portion being adapted to be manipulated to disengage the bulge from the protrusion and allow relative movement between the first and second parts.

15. The connector assembly according to claim 1, wherein the first part comprises a first fluid passage and the second part comprises a second fluid passage, and the first and second passages cooperatively define a chamber in the connected configuration.

16. The connector assembly according to claim 15, further comprising:
   a fluid pressure regulator received in the chamber.

17. The connector assembly according to claim 16, further comprising:
   a first seal interposed between the first fluid passage and the fluid pressure regulator; and
   a second seal interposed between the second fluid passage and the fluid pressure regulator.

18. The connector assembly according to claim 17, wherein substantially all fluid flow between the first and second passages passes through the fluid pressure regulator in the connected configuration.

19. A method of disconnecting a connection between a first part and a second part, the first part extends along a longitudinal axis and has a protrusion extending radially outward from the longitudinal axis, the second part receives the first part and has a wall surrounding the longitudinal axis, the wall has an inner surface generally confronting the longitudinal axis, an outer surface generally facing opposite the inner surface, a channel cooperatively receiving the protrusion, and an arm portion having a first surface defining a portion of the inner surface, a second surface defining a portion of the outer surface, a bulge extending from the arm portion into the channel for engaging the protrusion and maintaining the first and second parts in a connected configuration, and a grip portion extending from the second surface, the method comprising:

displacing the grip relative to the longitudinal axis so as to disengage the bulge from the protrusion;

relatively rotating about the longitudinal axis the first and second parts;

relatively displacing along the longitudinal axis the relatively rotated first and second parts; and relatively separating the relatively displaced first and second parts.

20. The method according to claim 19, further comprising:

extracting a fluid pressure regulator from between the relatively separated first and second parts.

* * * * *